United States Patent [19]

Kamegasawa et al.

[11] Patent Number: 5,165,253
[45] Date of Patent: Nov. 24, 1992

[54] MULTIPLE COOLING MEDIUM RECOVERY APPARATUS

[75] Inventors: Masao Kamegasawa, Isesaki; Keiichi Tomaru, Fujioka, both of Japan

[73] Assignee: Sanden Corporation, Gunma, Japan

[21] Appl. No.: 680,119

[22] Filed: Apr. 3, 1991

[30] Foreign Application Priority Data

Apr. 4, 1990 [JP] Japan .................. 2-88123

[51] Int. Cl.$^5$ ............................. F25B 45/00
[52] U.S. Cl. ........................ 62/292; 62/149; 62/77
[58] Field of Search ............ 62/77, 85, 292, 474, 62/475, 195, 149

[56] References Cited

U.S. PATENT DOCUMENTS

| | | | |
|---|---|---|---|
| 4,285,206 | 8/1981 | Koser | 62/149 |
| 4,476,688 | 10/1984 | Goddard | 62/475 |
| 4,539,817 | 9/1985 | Staggs et al. | 62/149 |
| 4,869,313 | 9/1989 | Fredley | 62/149 |
| 4,887,435 | 12/1989 | Anderson, Jr. | 62/292 |
| 4,939,905 | 7/1990 | Manz | 62/77 |

FOREIGN PATENT DOCUMENTS

| | | |
|---|---|---|
| 3805832 | 1/1989 | Fed. Rep. of Germany . |
| 2282605 | 3/1976 | France . |
| 2451558 | 10/1980 | France . |

*Primary Examiner*—John Sollecito
*Attorney, Agent, or Firm*—Baker & Botts

[57] ABSTRACT

A multiple cooling medium recovery apparatus comprising, a refrigerating circuit which circulates a refrigerant through a compressor, a condenser, an expansion valve, a heat exchanger with an evaporation path and a compressor, and a plurality of recovery routes separated from one another to which a plurality of kinds of cooling mediums to be recovered are supplied, respectively. A plurality of condensation paths are formed in the heat exchanger separaately from one another. Each recovery route defines a condensation path separately from the other recovery routes. A plurality of independent recovery routes are formed in a single recovery apparatus. A plurality of kinds of cooling mediums can be recovered simultaneously, or without cleaning the apparatus before each recovery.

13 Claims, 5 Drawing Sheets

MULTIPLE COOLING MEDIUM RECOVERY APPARATUS

BACKGROUND OF THE INVENTION

1. Field of the Invention

The present invention relates to a multiple cooling medium recovery apparatus used for recovering cooling mediums, such as a freon, gas etc., which are used, for example, in air conditioners of vehicles.

2. Description of the Prior Art

In coolers or air conditioners for vehicles, for example, freon is used as a cooling medium for the cooling circuits. Freon, however, has a detrimental affect on the ozone layer surrounding the earth if it is discharged into the atmosphere. Therefore, when a vehicle is scrapped, or a car cooler or an air conditioner is repaired, it is necessary to prevent the discharge of the freon into the atmosphere. Moreover, it is also necessary to recover the freon from such cooling apparatuses, because production levels of freon is limited and the freon must be reused. In a conventional cooling medium recovery system, a gaseous cooling medium, such as freon gas, is extracted from a cooling apparatus and supplied to a cooling medium recovery apparatus. The gaseous cooling medium is cooled and liquefied by the cooling medium recovery apparatus, and the liquefied cooling medium is then recovered.

In such a conventional cooling medium recovery system, the recovery route for recovering the cooling medium is comprised of a single route. Consequently, only one kind of cooling medium can usually be recovered. However, in practice, many kinds of cooling mediums generally need to be recovered. Therefore, to prevent mixing of the different kinds of cooling mediums to be recovered, the apparatus must be cleaned before each recovery. Further, different kinds of cooling mediums cannot be simultaneously recovered in the conventional cooling medium recovery apparatus.

SUMMARY OF THE INVENTION

Accordingly, an object of the present invention is to provide a multiple cooling medium recovery apparatus capable of recovering different kinds of cooling mediums simultaneously or without cleaning the apparatus before each recovery.

To achieve these objects, a multiple cooling medium recovery apparatus according to the present invention is herein provided. The multiple cooling medium recovery apparatus comprises a refrigerating circuit and a plurality of recovery routes separated from one another. The refrigerating circuit compresses a refrigerant by a compressor, condenses and liquefies the compressed refrigerant by a condenser, supplies the refrigerant to an evaporation path of a heat exchanger through an expansion valve and returns the refrigerant to the suction side of the compressor. A plurality of kinds of cooling mediums to be recovered are supplied to the plurality of recovery routes, respectively. A plurality of separate condensation paths are formed in the heat exchanger. Each of the plurality of recovery routes is connected to each of the plurality of condensation paths.

In the multiple cooling medium recovery apparatus according to the present invention, a plurality of recovery routes independent from one another are formed in a single recovery apparatus. Different kinds of cooling mediums to be recovered are supplied to the respective recovery routes, and the cooling mediums are cooled and liquefied in the respective condensation paths independently from one another. Therefore, the different kinds of cooling mediums can be simultaneously recovered without mixing of the cooling mediums. Moreover, since each recovery route can be employed for a specified kind of cooling medium, it is not necessary to clean the route or the routes before each recovery.

BRIEF DESCRIPTION OF THE DRAWINGS

Some preferred exemplary embodiments of the invention will now be described with reference to the accompanying drawings, which are given by way of example only, and are not intended to limit the present invention.

DETAILED DESCRIPTION OF PREFERRED EMBODIMENTS OF THE INVENTION

Figure 1:
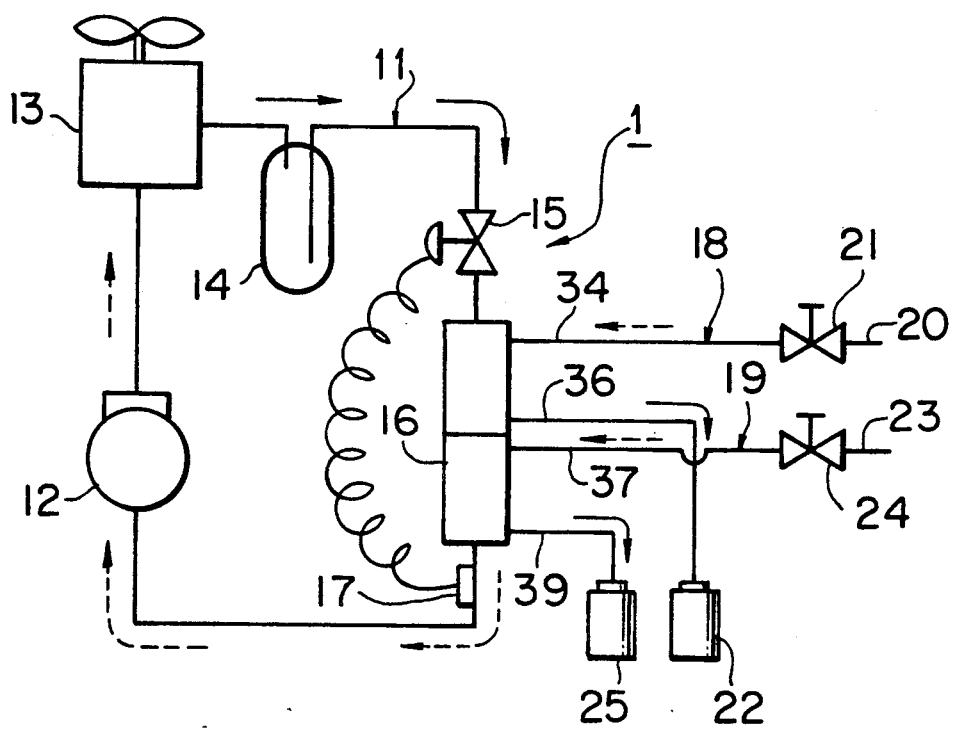
FIG. 1 is a schematic view of a multiple cooling medium recovery apparatus according to a first embodiment of the present invention.

Referring to the drawings, FIGS. 1 to 4 illustrate a multiple cooling medium recovery apparatus according to a first embodiment of the present invention. In FIG. 1, a multiple cooling medium recovery apparatus 1 has a refrigerating circuit 11 and two recovery routes 18 and 19. Refrigerating circuit 11 comprises a compressor 12, a condenser 13, a receiver dryer 14, an expansion valve 15 and a heat exchanger 16 connected in series to form a closed circuit. A refrigerant, such as R-502 (freon), is circulated in this refrigerating circuit 11. The refrigerant is compressed by compressor 12. The compressed refrigerant is supplied from the discharge side of compressor 12 to condenser 13. Condenser 13 cools and condenses the refrigerant to liquefy the refrigerant. The liquefied refrigerant is stored in receiver dryer 14. Only liquid refrigerant is extracted from receiver dryer 14, and expanded by expansion valve 15. The expanded refrigerant is supplied to an evaporation path 2 (FIG. 2) of heat exchanger 16, and evaporated therein. A temperature sensing tube 17 is provided on the exit side of heat exchanger 16. The temperature sensing tube 17 detects the temperature of the refrigerant. The opening degree of expansion valve 15 is controlled in accordance with the output of temperature sensing tube 17.

A first recovery route 18 and a second recovery route 19 are connected to heat exchanger 16. A first cooling medium to be recovered, such as R-22 (freon), is supplied to an inlet 20 of the first recovery route 18. The first cooling medium is sent to heat exchanger 16 through a hand valve 21. A recovery tank 22 is provided on the exit side from heat exchanger 16 of the first recovery route 18. A second cooling medium to be recovered, such as R-12 (freon), is supplied to an inlet 23 of the second recovery route 19. The second cooling medium is sent to heat exchanger 16 through a hand valve 24. A recovery tank 25 is provided on the exit side from heat exchanger 16 of the second recovery route 19. In FIG. 1, the arrows show the flows of the refrigerant and the first and second cooling mediums. The continuous lines indicate the flow of liquids, and the dashed lines indicate the flow of gases.

Figure 2:
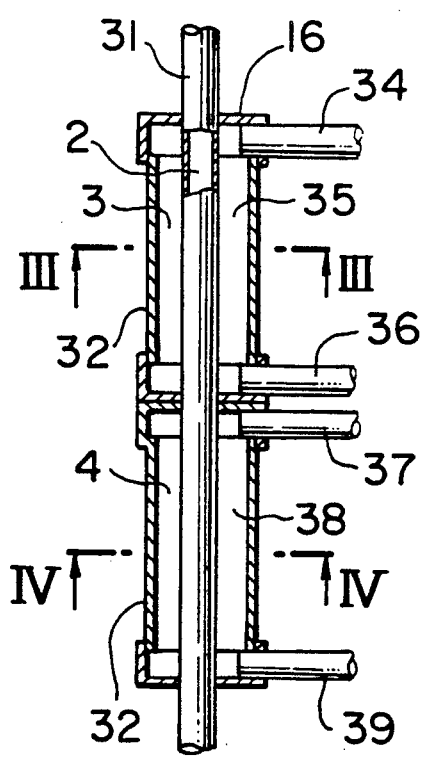
FIG. 2 is an enlarged vertical sectional view of a heat exchanger of the apparatus shown in FIG. 1.
Figure 3:
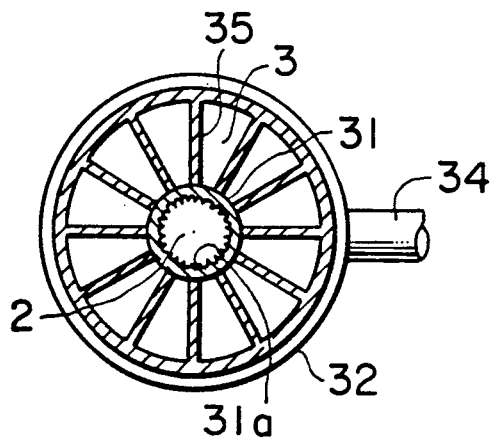
FIG. 3 is an enlarged cross sectional view of the heat exchanger shown in FIG. 2, taken along III—III line of FIG. 2.
Figure 4:
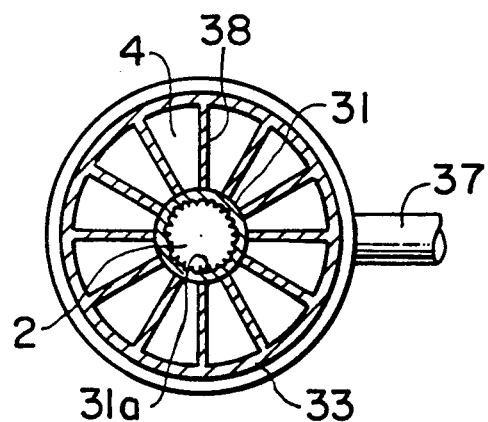
FIG. 4 is an enlarged cross sectional view of the heat exchanger shown in FIG. 2, taken along IV—IV line of FIG. 2.
Figure 5:
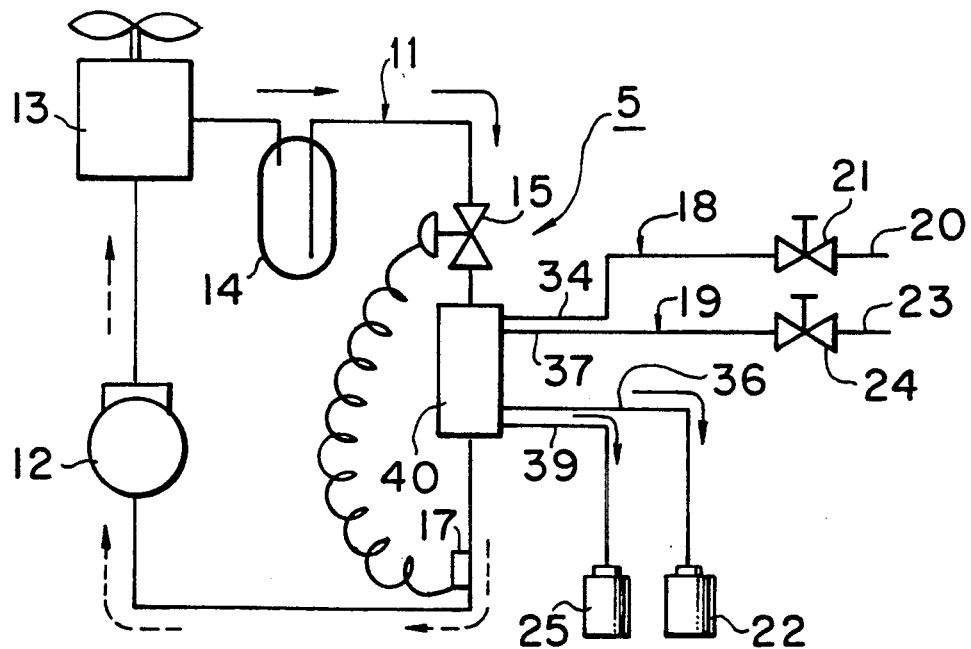
FIG. 5 is a schematic view of a multiple cooling medium recovery apparatus according to a second embodiment of the present invention.
Figure 6:
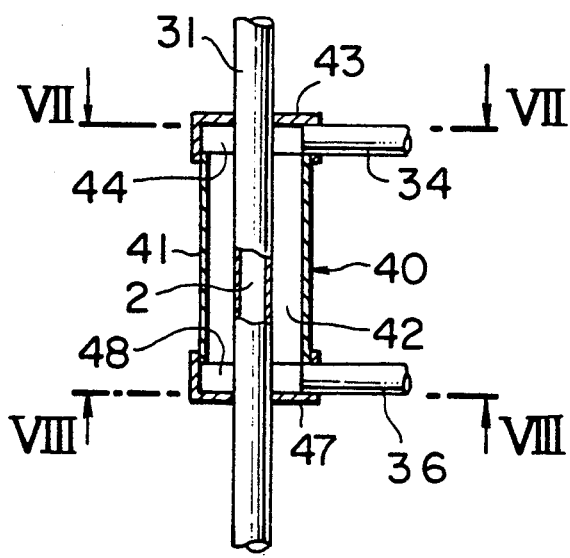
FIG. 6 is an enlarged vertical sectional view of a heat exchanger of the apparatus shown in FIG. 5.
Figure 7:
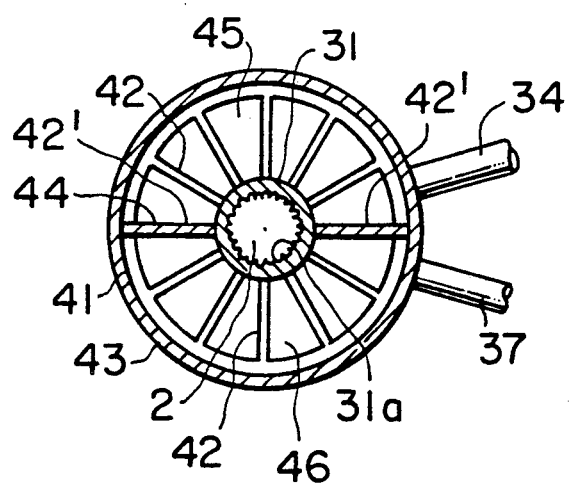
FIG. 7 is an enlarged cross sectional view of the heat exchanger shown in FIG. 6, taken along VII—VII line of FIG. 6.
Figure 8:
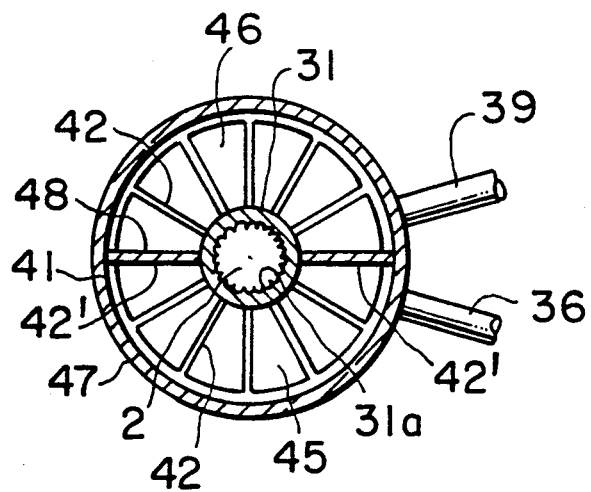
FIG. 8 is an enlarged cross sectional view of the heat exchanger shown in FIG. 6, taken along VIII—VIII line of FIG. 6.

FIGS. 2 to 4 illustrate the detailed structure of heat exchanger 16. An evaporating tube 31 forming evaporation path 2 therein extends through heat exchanger 16. Evaporating tube 31 has grooves 31a extending in the axial direction of the evaporating tube on its inner surface. The grooves 31a can increase the efficiency of the heat exchange between the refrigerant and the cooling mediums to be recovered.

A first condensing tube 32 and a second condensing tube 33 are provided around evaporating tube 31, such that tubes 32 and 33 are coaxial with evaporating tube 31. The condensing tubes 32 and 33 are arranged in series along the evaporating tube 31. The first condensing tube 32 forms a first condensation path 3 therein. The second condensing tube 33 forms a second condensation path 4 therein.

An introducing pipe 34 of the first recovery route 18 is connected to the upper portion of the first condensing tube 32. The first cooling medium to be recovered is supplied to the first condensation path 3 through introducing pipe 34. A plurality of partitions 35 are provided in first condensing tube 32. Partitions 35 extend radially between the outer surface of evaporating tube 31 and the inner surface of first condensing tube 32. The partitions 35 divide the first condensation path 3 into a plurality of paths. During passage through the first condensation path 3, the first cooling medium to be recovered is cooled and liquefied by a heat exchange process with the refrigerant passing through evaporating tube 31. Following the heat exchanger 16, the liquefied first cooling medium is discharged through pipe 36 and stored in recovery tank 22. Pipe 36 of the first recovery route 18 extends between the lower portion of the first condensing tube 32 and the recovery tank.

Similarly, an introducing pipe 37 of the second recovery route 19 is connected to the upper portion of the second condensing tube 33. The second cooling medium to be recovered is supplied to the second condensation path 4 through introducing pipe 37. A plurality of partitions 38 are provided in second condensing tube 33. Partitions 38 extend radially between the outer surface of evaporating tube 31 and the inner surface of second condensing tube 33. The partitions 38 divide the second condensation path 4 into a plurality of paths. During passage through the second condensation path 4, the second cooling medium to be recovered is cooled and liquefied by a heat exchange process with the refrigerant passing through evaporating tube 31. Following heat exchanger 16, the liquefied second cooling medium is discharged through pipe 39 and stored in recovery tank 25. Pipe 39 of the second recovery route 19 extends between the lower portion of the second condensing tube 33 and the recovery tank.

The refrigerant for liquefying the cooling mediums to be recovered has a lower boiling point than the cooling mediums. The different cooling mediums to be recovered are arranged so that the cooling medium introduced into the upstream (relative to the refrigerant flow) condensation path (i.e., the first condensation path 3) has a boiling point lower than that of the cooling medium introduced into the downstream (relative to the refrigerant flow) condensation path (i.e., the second condensation path 4). Therefore, although the temperature of the refrigerant elevates as it flows downstream in heat exchanger 16, the heat exchange between the refrigerant and the cooling mediums can still proceed with a high efficiency. For example, R-502 (freon) having a boiling point of −45.6° C. is one preferred refrigerant usable in the present system. If the system were selected to recover R-22 (freon) having a boiling point of −40.8° C. and R-12 (freon) having a boiling point of −29.8° C., the R-22 (freon) would be selected as the first of the two cooling mediums since it has the lower boiling point.

FIGS. 5 to 8 illustrate a multiple cooling medium recovery apparatus 5 according to a second embodiment of the present invention. In this embodiment, evaporating tube 31 extends through a heat exchanger 40. A condensing tube 41 is provided around evaporating tube 31 such that tube 41 is coaxial with the evaporating tube. A first condensation path 45 and a second condensation path 46 are both formed in condensing tube 41. The first and second condensation paths 45 and 46 are arranged in parallel relative to evaporation path 2. Introducing pipe 34 and pipe 36 of the first recovery route 18 are connected to the first condensation path 45. Introducing pipe 37 and pipe 39 of the second recovery route 19 are connected to the second condensation path 46. A plurality of partitions 42 are provided in condensing tube 41. A plurality of partitions 42 are between the outer surface of evaporating tube 31 and the inner surface of condensing tube 41. Two of the partitions 42' divide the inside of condensing tube 41 into the first and second condensation paths 45 and 46. The other partitions 42 divide the first and second condensation paths 45 and 46 into a plurality of paths, respectively. Partitions 44 are provided across an upper cover portion 43 of condensing tube 41 to divide the inside of the upper cover portion into two parts corresponding to the first and second condensation paths 45 and 46. Partitions 44 are connected to the dividing partitions 42'. Partitions 48 are provided across a lower cover portion 47 of condensing tube 41 to divide the inside of the lower cover portion into two parts corresponding to the first and second condensation paths 45 and 46. Partitions 48 are connected to the same dividing partitions 42' as partitions 44. By this structure, the inside of condensing tube 41 is divided into the first and second condensation paths 45 and 46.

The first cooling medium to be recovered is supplied to the first condensation path 45 through introducing pipe 34 connected to upper cover portion 43 of condensing tube 41. As the first cooling medium to be recovered passes through the first condensation path 45, it is cooled and liquefied by a heat exchange process with the refrigerant passing through evaporating tube 31. The liquefied first cooling medium is discharged through pipe 36 and stored in recovery tank 22. Pipe 36 of the first recovery route 18 extends between the lower portion of the condensing tube 41 and the recovery tank.

Similarly, the second cooling medium to be recovered is supplied to the second condensation path 46 through introducing pipe 37 connected to upper cover portion 43 of condensing tube 41. As the second cooling medium to be recovered passes through the second condensation path 46, it is cooled and liquefied by a heat exchange process with the refrigerant passing through evaporating tube 31. The liquefied second cooling medium is discharged through pipe 39 and stored in recovery tank 25. Pipe 39 of the second recovery route 19 extends between the lower portion of the condensing tube 41 and the recovery tank.

Thus, a plurality of condensation paths may be arranged in parallel relative to an evaporation path. In this embodiment, the apparatus can be of a reduced size in comparison with the first embodiment.

Although only two condensation paths are formed in a heat exchanger in the above first and second embodiments, three or more condensation paths may be formed in a heat exchanger in the present invention.

Figure 9:
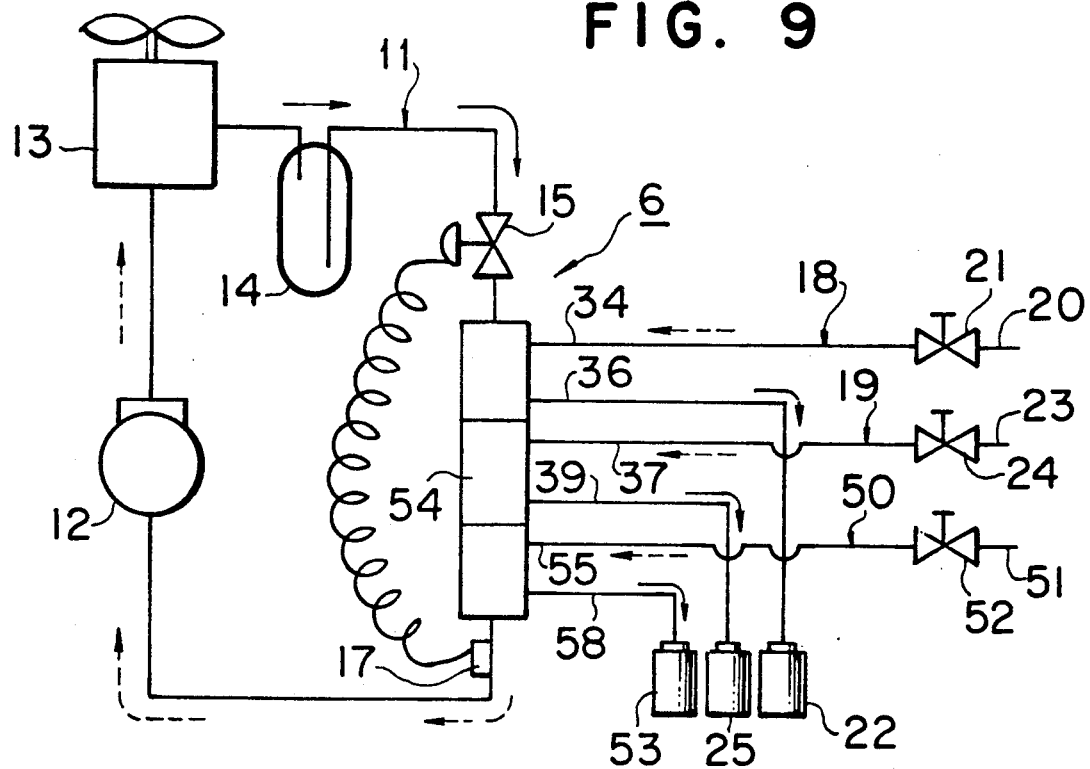
FIG. 9 is a schematic view of a multiple cooling medium recovery apparatus according to a third embodiment of the present invention.
Figure 10:
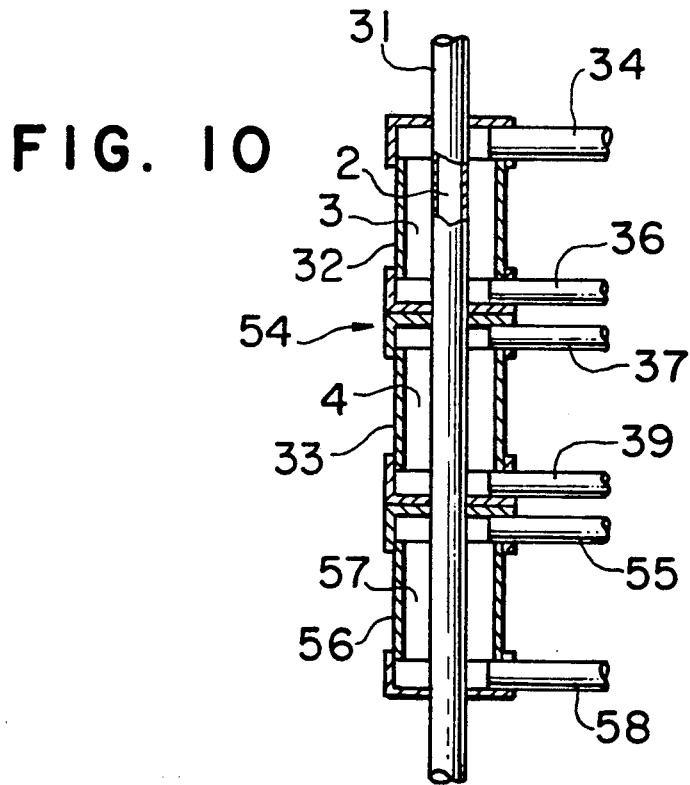
FIG. 10 is an enlarged vertical sectional view of a heat exchanger of the apparatus shown in FIG. 9.

FIGS. 9 and 10 illustrate a multiple cooling medium recovery apparatus 6 according to a third embodiment of the present invention. This embodiment is a modification of the first embodiment aforementioned. A third recovery route 50 is provided besides first and second recovery route 18 and 19 in this embodiment. A third cooling medium to be recovered is supplied to an inlet 51 of the third recovery route 50. The third cooling medium is sent to a heat exchanger 54 through a hand valve 52. A recovery tank 53 is provided on the exit side from heat exchanger 54 of the third recovery route 50. A third condensing tube 56 is provided around evaporating tube 31 such that tube 56 is coaxial with the evaporating tube at a position downstream of the second condensing tube 33 in the flow direction of the refrigerant. The first, second and third condensing tubes 32, 33 and 56 are arranged in series along the evaporating tube 31. The third condensing tube 56 forms a third condensation path 57 therein.

An introducing pipe 55 of the third recovery route 50 is connected to the upper portion of the third condensing tube 56. The third cooling medium to be recovered is supplied to the third condensation path 57 through introducing pipe 55. As the third cooling medium to be recovered passes through the third condensation path 57, it is cooled and liquefied by a heat exchange process with the refrigerant passing through evaporating tube 31. The liquefied third cooling medium is discharged through pipe 58 and stored in recovery tank 53. Pipe 58 of the third recovery route 50 extends between the lower portion of the third condensing tube 56 and the recovery tank.

Figure 11:
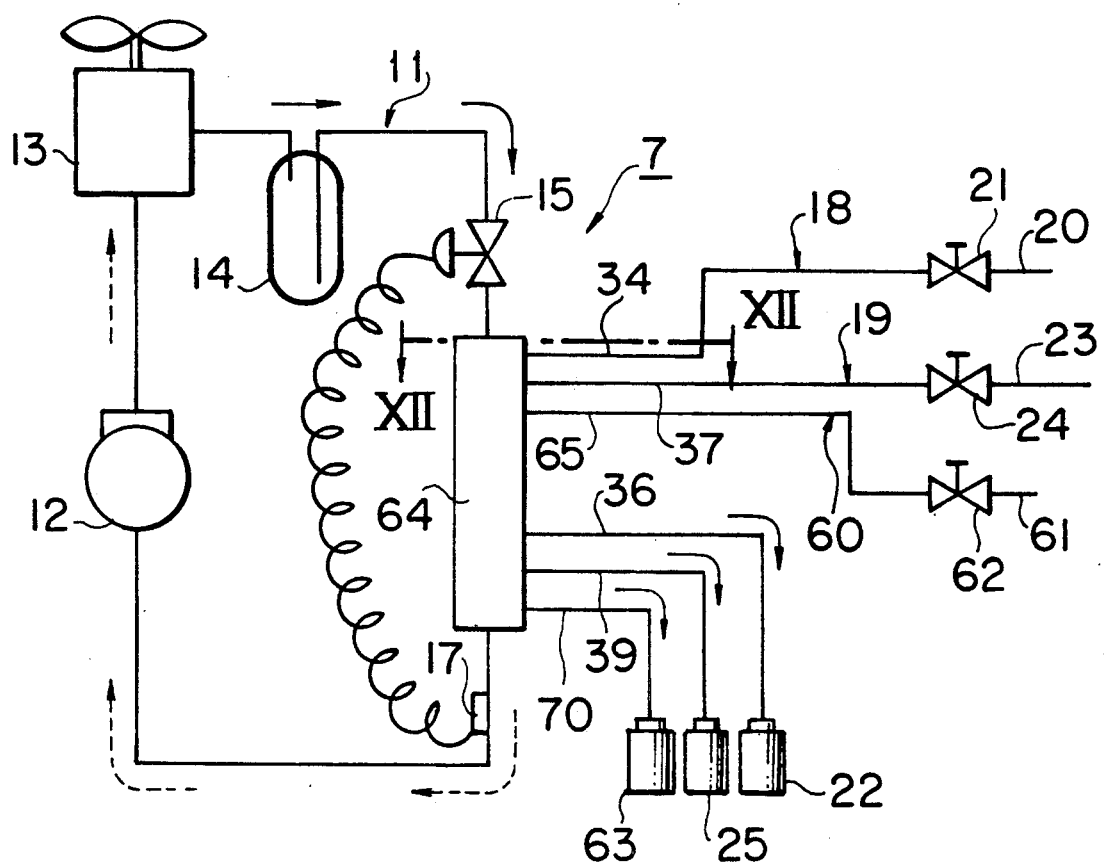
FIG. 11 is a schematic view of a multiple cooling medium recovery apparatus according to a fourth embodiment of the present invention.
Figure 12:
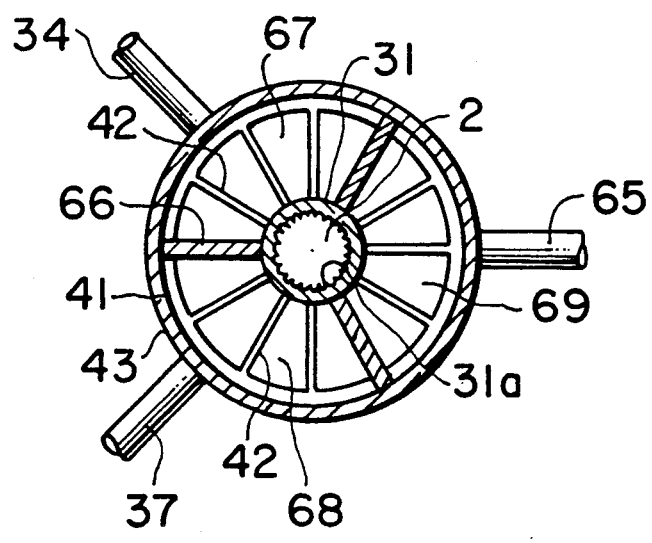
FIG. 12 is an enlarged cross sectional view of a heat exchanger of the apparatus shown in FIG. 11, taken along XII—XII line of FIG. 11.

FIGS. 11 and 12 illustrate a multiple cooling medium recovery apparatus 7 according to a fourth embodiment of the present invention. This embodiment is a modification of the second embodiment aforementioned. In this embodiment, the inside of condensing tube 41 is divided into three condensation paths; i.e., a first condensation path 67, a second condensation path 68 and a third condensation path 69. The three paths are divided by three dividing partitions 42, entrance side partitions 66 and exit side partition (not shown). The first, second and third condensation paths 67, 68 and 69 are arranged in parallel around the evaporating tube 31. A third cooling medium is supplied to an inlet 61 of a third recovery route 60. The third cooling medium is sent to a heat exchanger 64 through a hand valve 62. The third cooling medium is introduced into the third condensation path 69 through an introducing pipe 65 connected to upper cover portion 43 of condensing tube 41. As the third cooling medium to be recovered passes through the third condensation path 69, it is cooled and liquefied by a heat exchange process with is heat exchanged with the refrigerant passing through evaporating tube 31. The liquefied third cooling medium is discharged through pipe 70 and stored in recovery tank 63. Pipe 70 of the third recovery route 60 extends between the lower portion of the condensing tube 41 and the recovery tank.

Although several preferred embodiments of the present invention have been described herein in detail, it will be appreciated by those skilled in the art that various modifications and alterations can be made to these embodiments without materially departing from the novel teachings and advantages of this invention. Accordingly, it is to be understood that all such modifications and alterations are included within the scope of the invention as defined by the following claims.

What is claimed is:

1. A multiple cooling medium recovery apparatus comprising:

a refrigerating circuit including a compressor for compressing a refrigerant, a condenser for condensing and liquefying the compressed refrigerant, an evaporation path forming a path of a heat exchanger, and means for supplying the refrigerant to said evaporation path of the heat exchanger through an expansion valve and returning the refrigerant to the suction side of said compressor: and a plurality of recovery routes separated from one another, said recovery routes receiving a plurality of kinds of cooling mediums to be recovered, respectively, each of said plurality of recovery routes including a condensation path forming a part of said heat exchanger, said condensation paths being separate from one another.

2. The apparatus according to claim 1 wherein said condensation paths are arranged in series along said evaporation path.

3. The apparatus according to claim 1 wherein said condensation paths are arranged in parallel relative to said evaporation path.

4. The apparatus according to claim 1 wherein said refrigerant has a boiling point lower than the boiling points of said plurality of kinds of cooling mediums.

5. The apparatus according to claim 2 wherein one condensation path is upstream of at least one other condensation path in the direction of the flow of said refrigerant along said evaporation path, and wherein the cooling medium received by said upstream condensation path has a lower boiling point than the cooling medium received by said at least one downstream condensation path.

6. The apparatus according to claim 1 wherein said plurality of condensation paths are formed around said evaporation path.

7. The apparatus according to claim 6 wherein said plurality of condensation paths are formed around said evaporation path in a coaxial manner relative to said evaporation path.

8. The apparatus according to claim 1 wherein each of said plurality of condensation paths is divided into a plurality of paths by a plurality of partitions.

9. The apparatus according to claim 3 wherein an evaporating tube forms said evaporation path and a condensing tube is provided around said evaporating tube to form said plurality of condensation paths therein, and wherein said condensing tube has an upper cover portion and at least one partition which is provided in said upper cover portion to divide the inside of said upper cover portion into segments of said plurality of condensation paths.

10. The apparatus according to claim 9 wherein said condensing tube is divided into a plurality of paths by a plurality of dividing partitions, and wherein said at least one partition of said upper cover portion is connected to corresponding dividing partitions of said condensing tube.

11. The apparatus according to claim 3 wherein an evaporating tube forms said evaporation path and a condensing tube is provided around an evaporating tube to form said plurality of condensation paths therein, and wherein said condensing tube has a lower cover portion and at least one partition which is provided in said lower cover portion to divide the inside of said lower cover portion into segments of said plurality of condensation paths.

12. The apparatus according to claim 11 wherein said condensing tube is divided into a plurality of paths by a plurality of dividing partitions, and wherein said at least one partition of said lower cover portion is connected to corresponding dividing partitions of said condensing tube.

13. The apparatus according to claim 1 wherein said evaporation path is formed by an evaporating tube, and said evaporating tube has grooves extending in the axial direction of said evaporating tube on its inner surface.

* * * * *